United States Patent
Coombes et al.

(10) Patent No.: US 6,650,908 B1
(45) Date of Patent: *Nov. 18, 2003

(54) COMMUNICATIONS SYSTEM FOR PROVIDING MULTIPLE SERVICES AND HOLD CAPABILITY OF AT LEAST ONE SERVICE, AND METHOD THEREFOR

(75) Inventors: Daniel J. Coombes, Glenn Ellen, IL (US); Robert J. Epsom, Inverness, IL (US); Anatoly S. Belkin, Mount Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/541,250

(22) Filed: Apr. 3, 2000

Related U.S. Application Data

(62) Division of application No. 08/944,979, filed on Oct. 7, 1997, now Pat. No. 6,138,030.

(51) Int. Cl.[7] .................................. H04B 1/38
(52) U.S. Cl. ..................... 455/560; 455/561; 455/414; 455/521; 455/507; 455/508
(58) Field of Search .................. 455/560, 561, 455/414, 521, 507, 508, 422, 442

(56) References Cited

U.S. PATENT DOCUMENTS

| | | | | |
|---|---|---|---|---|
| 5,548,631 A | * | 8/1996 | Krebs et al. | 455/426 |
| 5,664,007 A | * | 9/1997 | Samadi et al. | 455/442 |
| 6,138,030 A | * | 10/2000 | Coombes et al. | 455/507 |
| 6,408,177 B1 | * | 6/2002 | Parikh et al. | 455/414 |

* cited by examiner

*Primary Examiner*—Nguyen T. Vo
*Assistant Examiner*—David Nguyen
(74) *Attorney, Agent, or Firm*—Scott M. Garrett

(57) ABSTRACT

A communications system infrastructure (100), such as an integrated services radio system, is provided with a hold processor (126). The hold processor is operably coupled to at least one base station controller (114). If a mobile subscriber unit (102) is actively engaged in a first communication service, such as a telephone interconnect call, and desires to use a second communication service, such as making or responding to a dispatch call, the mobile subscriber unit request the first service to be held. The base station controller then switches the first service to the hold server, which in turn generates an identifier for transmittal to the mobile subscriber unit for storage and call retrieval at a later time.

3 Claims, 4 Drawing Sheets

COMMUNICATIONS SYSTEM FOR PROVIDING MULTIPLE SERVICES AND HOLD CAPABILITY OF AT LEAST ONE SERVICE, AND METHOD THEREFOR

CROSS REFERENCE TO RELATED APPLICATIONS

This is a divisional of application Serial No. 08/944,979, filed Oct. 7, 1997, U.S. Pat. No. 6,138,030, and assigned to Motorola, Inc.

TECHNICAL FIELD

This invention relates in general to wireless communications systems, and more particularly to wireless communications systems that provide telephone interconnect service and dispatch service.

BACKGROUND

Wireless communication systems that utilize radio frequency carriers are well known in the art. Such systems include cellular telephone services and trunked dispatch services. Dispatch services differ from telephone services in a variety of ways, but are perhaps most easily distinguished from one another in that telephone communications are typically between two individuals that are uniquely and individually identified within the system, whereas dispatch communications allow for communications amongst a group of users, without the need to individually identify each group member before initiating the communication.

Both of these services are typically offered in most populated areas. The telephone services as provided through cellular systems are utilized by those who wish to have person-to-person access through the existing telephone network, and dispatch services are typically utilized by organizations, such as public safety agencies and various business operations, that require communications within groups of mobile users. Traditionally these two services have been offered separately, because of the different nature of communications. Recently, however, there have been communications systems designed offering both services. These are the so-called integrated services radio systems. Integrated services radio systems allow communications between individuals over the public switched telephone network, and dispatch type communications among groups of mobile users.

These systems take advantage of the similarities of such systems, and offer a competitive advantage since the cost of infrastructure equipment is reduced compared to outfitting separate telephone and dispatch systems. Such systems reduce the number and need for suitable antenna sites, for example, as well as base station facilities. Further benefiting the user, the user equipment, often hand held radio devices, offer access to both services, therefore reducing the burden on the user by eliminating the need to carry multiple devices. As a result, such systems are gaining widespread marketplace acceptance.

In using an integrated services radio communications system, there may arise a conflict between services when, for example, a user is involved in telephone call, and receives dispatch message for a group to which the same user belongs, or if the user needs to initiate a dispatch call. To date, in order to respond to the dispatch message or initiate one, the user must end the telephone call before proceeding with any other communications activity. This is obviously inconvenient to the user. Therefore, there is a need, in an integrated services radio system, for a means by which a user can respond to a dispatch message, while retaining telephone service.

DETAILED DESCRIPTION OF THE PREFERRED EMBODIMENT

Figure 1:
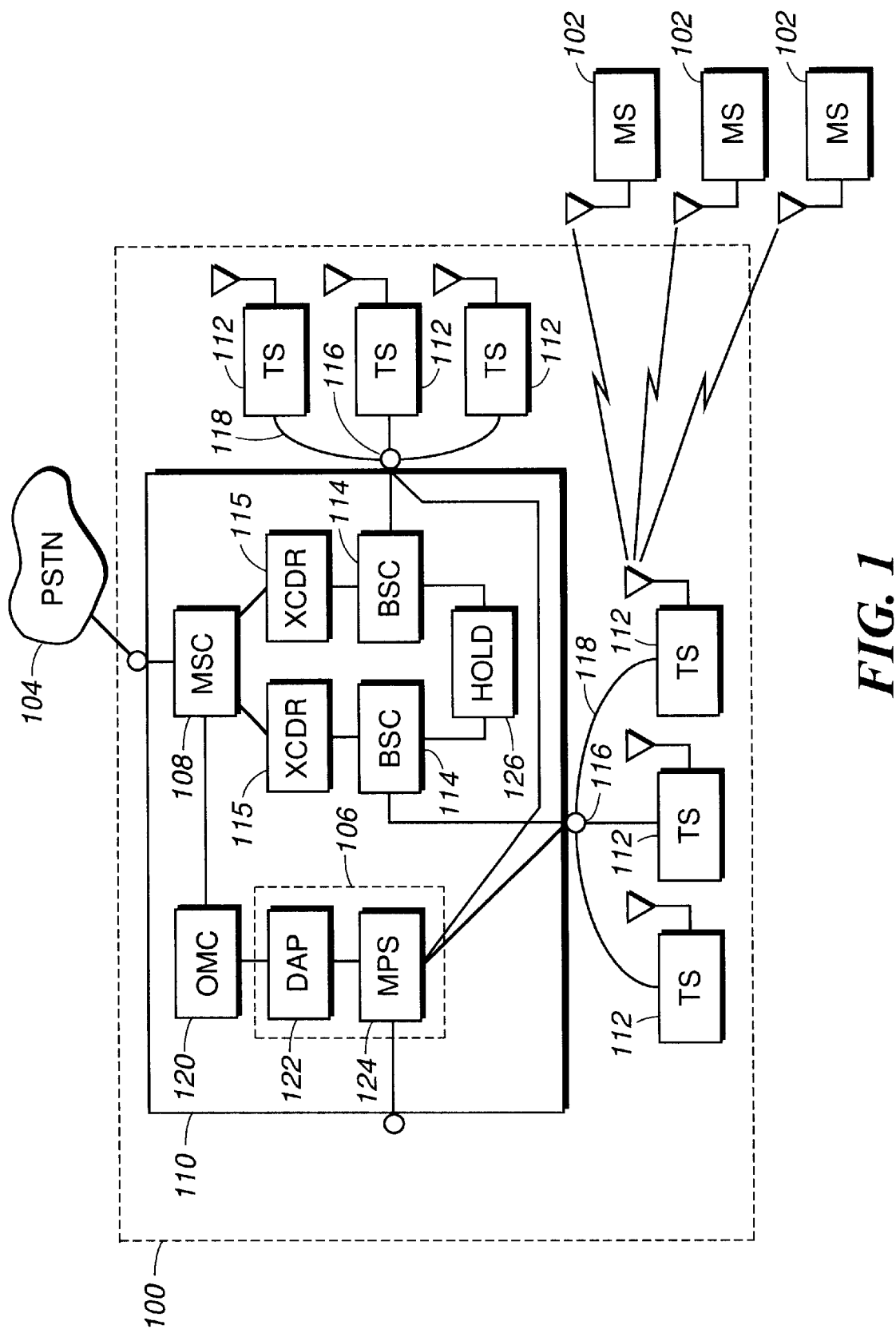
FIG. 1 shows a block diagram of an integrated services radio communications system in accordance with a first embodiment of the invention.

While the specification concludes with claims defining the features of the invention that are regarded as novel, it is believed that the invention will be better understood from a consideration of the following description in conjunction with the drawing figures, in which like reference numerals are carried forward.

In providing a solution to the problem of responding to a dispatch message or initiating a dispatch call while engaged in a telephone interconnect call, it is important to realize that a single user can only use one service at any given moment. However, the inconvenience of having to end a call before performing any secondary activity can be avoided by a technique similar to placing the call on hold. Integrated radio systems are somewhat new at this date, but an excellent example of such a system can be found in U.S. Pat. No. 5,548,631 to Krebs et al., and assigned to Motorola, the disclosure of which is hereby incorporated by reference.

Referring now to FIG. 1, there is shown a block diagram of an integrated services radio communications system in accordance with a first embodiment of the invention. The system includes an infrastructure 100 which provides service to one or more mobile units 102 (MS). The infrastructure provides telephone interconnect call capability to the public switched telephone network 104, and dispatch service to other mobile subscribers or groups of mobile subscribers by use of a dispatch control processor 106. Telephone interconnect calls are processed by a mobile switching center 108 (MSC), which may be as provided in digital cellular Global System for Mobile Communications (GSM), as is well understood in the art.

The infrastructure equipment 100 includes a central office 110, and a plurality of base stations or transceiver sites 112 (TS). Each transceiver site comprises radio transceivers configured to receive and transmit on appropriate frequencies and using appropriate modulation and air interface protocols as necessary to support the requirements of the services being provided. Ideally, the telephone interconnect service and dispatch service will utilize common frequencies, and open air interface specifications. When such is not the case, however, the services are still supportable provided care is taken to ensure that the transceiver sites are fully enabled to properly communicate with the mobile subscriber units 102. Each transceiver site 112 is operably coupled to, and shares, a base site controller 114 (BSC). Each base site controller may operate as provided by GSM specifications, and controls the operation of one or more transceiver sites. Each base site controller is operably coupled to the mobile switching center. In the preferred embodiment, a transcoder 115 (XCDR) is operably disposed between the base site controller and the mobile switching center, and converts coded data from the mobile subscriber units into pulse code modulated (PCM) data for the telephone network, and vice-versa. Also in the preferred embodiment, the base site controller communicates with the transceiver sites through an access control gateway 116 via an ethernet bus 118. So provided, the mobile switching center and base site controllers function to provide telephone service to the mobile subscriber units. Information about each particular mobile subscriber unit is stored and accessed by the mobile switching center in a database 120, such as an operations and maintenance center, which is operably coupled to the mobile switching center.

To provide dispatch service, the dispatch control processor is also operably coupled to the database 120, and comprises a dispatch applications processor 122 (DAP) and a metropolitan packet switch 124 (MPS). The dispatch applications processor can be comprised of current prior art trunked dispatch resource controllers as are well understood in the art. Such resource controllers function to allocate communication resources amongst dispatch service users, and perform the important function of alerting all members of a dispatch group that a dispatch call is imminently, or presently, underway, so that all members of the group can participate in the call. The metropolitan packet switch comprises a switch, as is well understood in the art, that routes audio signal between sites in order to facilitate the inclusion of group call members that are located in other sites that are also served by the dispatch system. The database 120 is also coupled to the dispatch control processor, and contains dispatch data for the mobile subscriber units, such as, for example, identification numbers, states of operability, alias information, roaming status, and so forth.

So provided, the mobile subscriber unit may make either a telephone interconnect call through the mobile switching center, or a dispatch call through the dispatch control processor. However, it is quite likely that, as such communication systems gain popularity, that a mobile subscriber unit engaged in a telephone interconnect call will, at some time during the interconnect call, receive a notification that a dispatch call for a group to which the mobile subscriber unit belongs is imminent, or presently underway. For such scenario, the invention provides the communication system with a hold processor, such as a hold server 126. In this first embodiment, there is a single, centralized hold server operably coupled to each base site controller 114 for holding the interconnect call, thus allowing the mobile subscriber unit to perform a second activity, such as make or respond to a dispatch call, change a battery on the mobile subscriber unit, and so forth.

The hold processor comprises equipment for providing the proper signaling in a telephone signal to indicate to other equipment in the public switched telephone network, and to the mobile switching center, that the call is still active. That is, the signaling used in telephone signals indicates whether the telephone set, in this case a mobile subscriber unit, is "off-hook", indicating an active line, or "on-hook", indicating that the telephone set is not in use, and the call is taken down. The hold server also comprises computer equipment means for generating and associating an identifier with each call to be held. In the preferred embodiment, the identifier is a numeric sequence which is unique in the system during the time it is in use. After being generated, it is transmitted to the base site controller, and on to the mobile subscriber unit where it is stored for later call retrieval. During the time the call is held at the hold server, the portion of the signal that would normally carry voice data can be filled with silence information, music, or advertising, for example.

During the time the telephone interconnect call is being held, the mobile subscriber unit will either stay within a serving cell, or move to a new one. In the former case, when the user is finished with the secondary activity, such as responding to a dispatch call, the mobile subscriber unit can retrieve the held telephone call by transmitting a request for re-connect, along with the identifier. The base site controller will then retrieve the telephone call from the hold server, and re-establish the call with the mobile subscriber unit.

If, while the telephone call is held, the mobile subscriber unit moves to a new cell, then a handover is necessary to re-establish the call. If the mobile subscriber unit was engaged in communications while the telephone call was being held, there will have already been a handoff to the new serving cell equipment. To complete the handover, the new serving cell transceiver site equipment, referred to as the target cell, transmits the request to its serving base site controller. The base site controller retrieves the held call from the hold server, and re-establishes the call on a new channel with the mobile subscriber unit.

Alternatively, if the mobile subscriber unit moves to a new serving area, under control of a different base site controller that the one from which a telephone interconnect call was placed on hold, when the mobile subscriber unit registers with the new serving equipment, it can indicate on a control channel that it has a call on hold at the hold server, and give the new base site controller the identifier to pre-retrieve the call. This can happen through signaling, without the user of the mobile equipment noticing. In other words, while the user is actively participating in a dispatch call, for example, the mobile equipment can send control messages through a control channel, much in the same way handoff information is communicated to the fixed equipment, regarding the held call. This allows a much faster call retrieval once the user completes the secondary activity and wishes to re-establish the telephone interconnect call.

A preferred handoff procedure is as follows. First, while the mobile subscriber unit is engaged in a telephone interconnect call, the user of the unit decides to hold the call. The call at that time is set up between the public switched telephone network, through the mobile switching center to the unit. There are two basic scenarios that could ensue. The first is when the mobile subscriber unit remains in the same serving area under a particular base site controller. When the mobile subscriber unit changes cells, the first step is updating the base site controller. The mobile subscriber unit sends a message to the base site controller that it has moved, what cell it is currently in, that it has a call being held by the hold server, and the identifier for the held call. The base site controller then performs the step of informing the hold server of the new location of the mobile subscriber unit. A second scenario occurs when the mobile subscriber unit enters a serving area of a new base site controller. In such an instance, the mobile subscriber unit must also inform the new base site controller that the hold server is holding a call for the mobile subscriber unit. The new base site controller will then communicate with the hold server, and update the location information of the mobile subscriber unit in the hold server.

Alternatively, the system may be configured to allow the mobile subscriber to initiate call retrieval. In such a configuration, to retrieve the call, the mobile subscriber unit will send the identifier for the held call, along with the current location of the mobile subscriber unit to the base site controller. The base site controller will then access the hold server, retrieve the call, and re-establish the link between the mobile switching center and the mobile subscriber unit.

Figure 2:
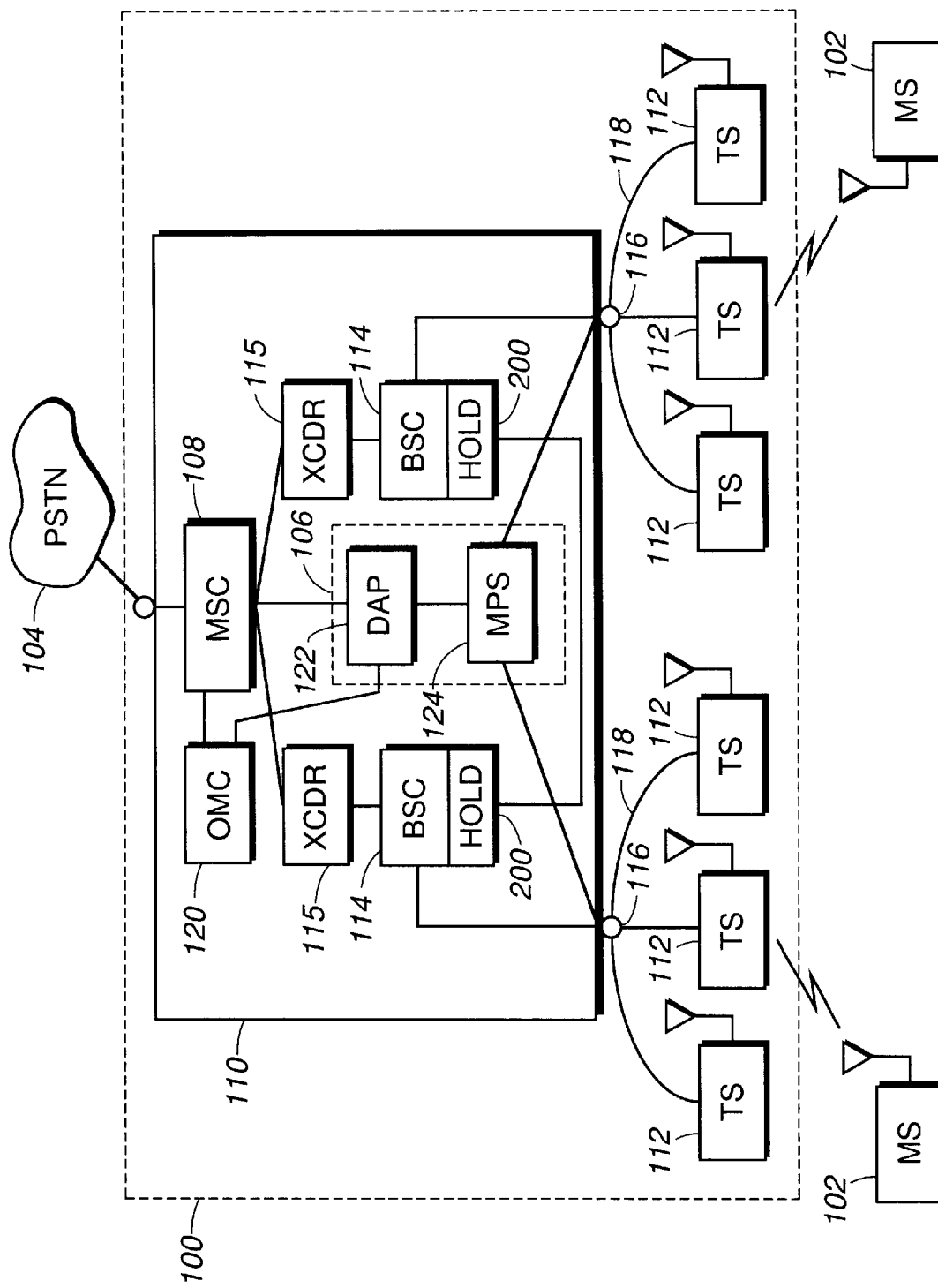
FIG. 2 shows a block diagram block diagram of an integrated services radio communications system in accordance with a second embodiment of the invention.

Referring now to FIG. 2, there is shown a block diagram of an integrated services radio communications system in accordance with a second embodiment of the invention. In this embodiment the function of the hold server is distributed through the central office 100. In the embodiment shown in FIG. 1, the hold server is a centrally disposed unit, operably coupled by conventional means to each base site controller. In this second embodiment, there is a hold processor, such as a hold node 200 operably coupled and associated with each base site controller 114. Each hold node is also operably coupled to each other hold node in the system to facilitate communication between the hold nodes for call retrieval when a mobile subscriber unit changes serving areas.

Each hold node performs a similar function as the hold server of FIG. 1, but does not have the same capacity for holding calls as it does not serve the entire system, but only a portion thereof. In providing this type of system architecture, the cost of outfitting the system may be reduced. Rather than having to purchase and maintain a large central hold server, a service provider can build the system and expand the call holding capability at a rate and capacity in proportion to the system growth. In distributing the hold capability in such a manner, when a call is placed on hold, the identifier transmitted to the mobile subscriber unit must contain information that can direct any other base site controller to the base site controller holding the call.

Handover of the held call would occur in the same manner as before. Either the mobile subscriber unit can initiate a call retrieval upon request by the user, or more preferably, the system can follow the mobile subscriber unit as it moves through the serving area and handoffs occur while engaged in a secondary activity in an automatic fashion. In an automatic mode, as each base site controller hands over information to the next base site controller, the held call would be switched to the new hold node as well. Typically, the base site controller handing over will signal the mobile switching center to switch the call to the new base site controller, where the call will continue to be held at the new base site controller's hold node.

Figure 3:
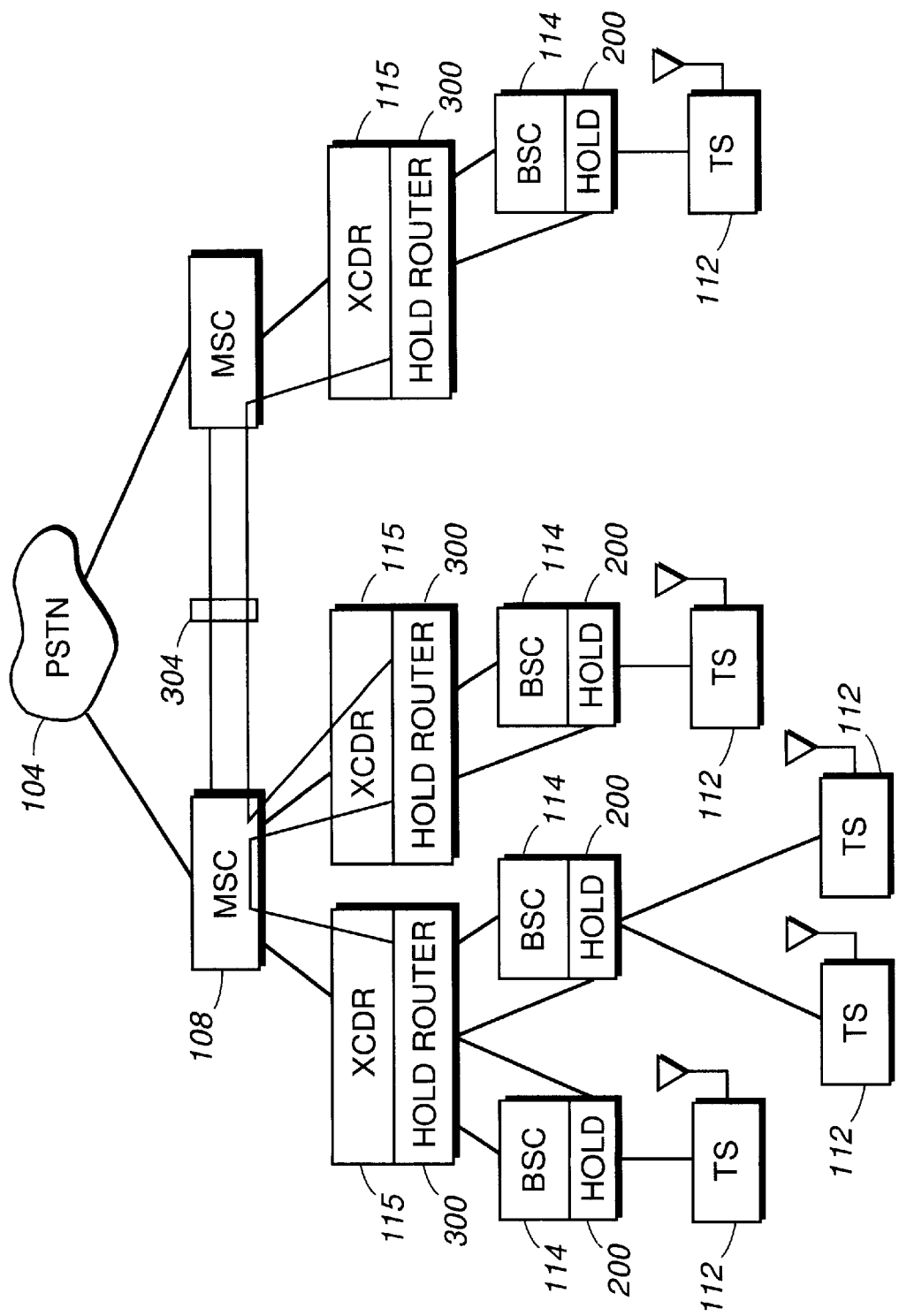
FIG. 3 shows a block diagram of an integrated services radio communications system in accordance with a third embodiment of the invention.

Referring now to FIG. 3, there is shown a block diagram of an integrated services radio communications system in accordance with a third embodiment of the invention. This third embodiment build from the concept disclosed in reference to FIG. 2, and utilizes hold nodes 200 operably coupled to individual base site controllers 114. However, a system architecture as shown in FIG. 2 requires a large number of communication links between hold nodes if the system is large, i.e. 100 nodes. By using utilizing a system architecture as shown in FIG. 3, the number of links is substantially reduced by use of the hold routers. Each router can service a plurality of base site controllers, and thus a similar plurality of hold nodes. In the preferred embodiment, the routers are placed at the same hierarchy as the transcoders 115, but they may be separate equipment.

The hold routers operate in a conventional data router fashion; each router contains a list of the other routers and the associated network addresses, and has communications links 302 through the mobile switching center to the other routers in the system. Furthermore, it is contemplated that in very large networks, a hold gateway 304 may exist between mobile switching centers, and even between competing service providers networks. The hold gateway permits call retrieval across different service provider's networks, and across large geographic areas, such as when the mobile subscriber unit is in roaming mode.

Figure 4:
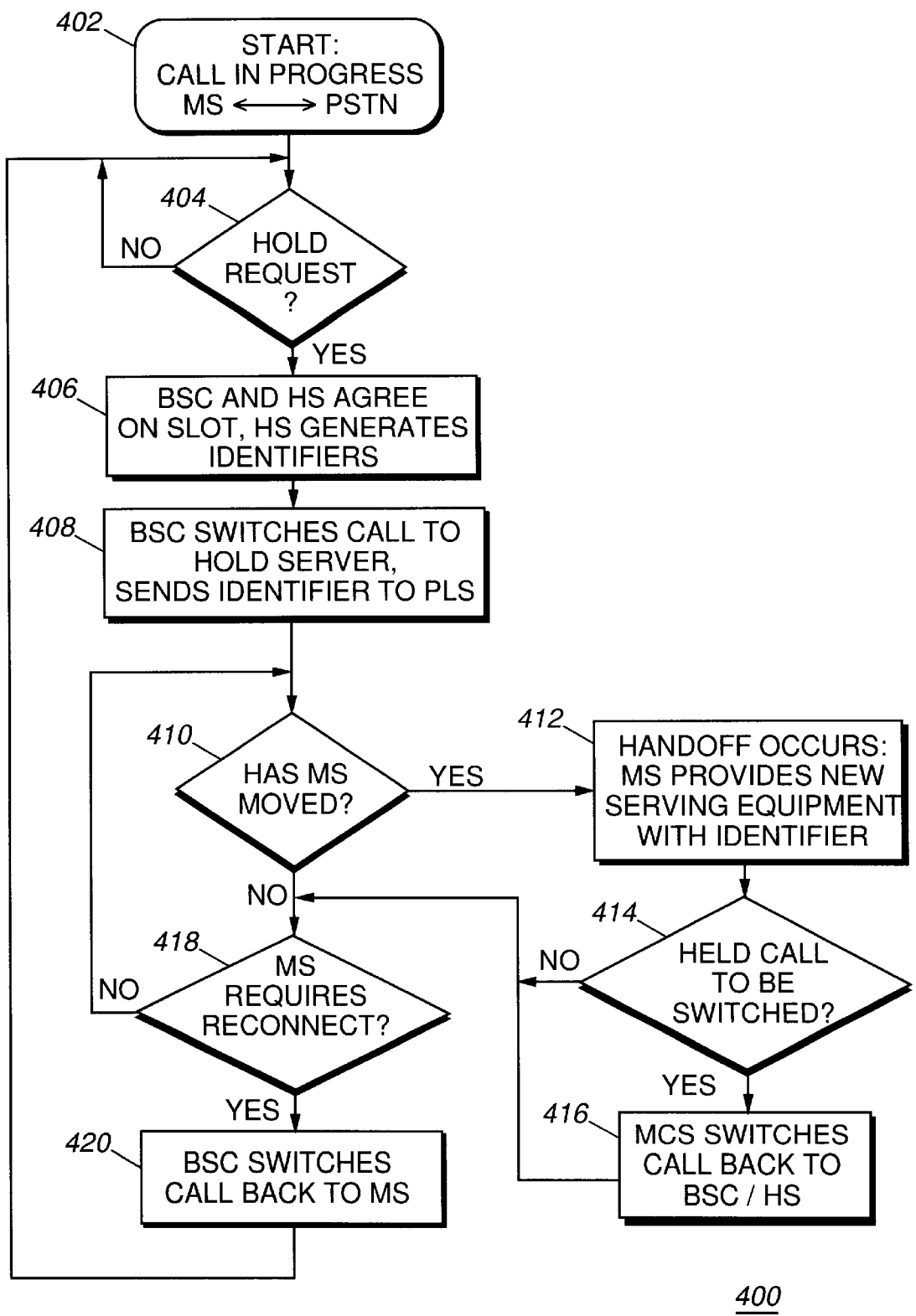
FIG. 4 shows a flow chart diagram of a process for holding a call in accordance with the invention.

The infrastructure embodiment illustrated in FIG. 3 is the most practical for large scale systems. In FIG. 4 a typical procedure for holding a call is shown. Referring now to FIG. 4, which shows a flow chart diagram 400 of a procedure for holding a call in accordance with the invention. The procedure begins with a call being set up 402 between a mobile subscriber unit and the PSTN through the infrastructure. At some point in time the mobile subscriber unit will send a request 404 to hold the call, and the infrastructure equipment, preferably the base site controller, will process the request. Upon receiving the hold request, the base site controller will communicate 406 with the hold entity, either a central server or a node. The hold entity will determine which slot to hold the call on, and will generate the identifier, passing this information back to the base site controller. Thereafter, the base site controller will switch 408 the call to the appropriate hold entity slot or channel, and send the identifier to the mobile equipment, thus indicating that the call is on hold and the mobile equipment can perform some other activity. At this point the equipment monitors 410 the location of the mobile subscriber unit in a conventional manner to determine if it changes serving areas. If so, then a handoff must occur 412.

The mobile subscriber will inform the new serving equipment, such as a base site controller, of the held call, along with the identifier, and if necessary 412, the network address of the holding entity. The infrastructure equipment will then switch the held call to a new hold entity if necessary 416. Subsequently, the equipment will monitor for a request to re-establish the call 418. If no such request is received, then the equipment will continue to monitor the location of the mobile subscriber unit, and wait for a request to reestablish the call. Once the request to re-establish is received, the present serving base site controller switches the held call form the holding entity, to the appropriate transceiver site, where it is re-established 420.

Thus, the invention allows a communications system providing multiple services with a means and method for holding a first communications service to permit a user to engage in a second communications service. It is contemplated that each type of service may be provided with a hold entity so that use of that service may be suspended, and held by the hold entity, so that the user may engage in other services. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for holding a call in a communications system, the communications system providing a plurality of communications services, the method comprising the steps of:

sending, from a mobile subscriber unit actively engaged in the call and located in a first serving area, to a first hold processor associated with a first base site controller associated with the serving area, a request to hold the call;

generating, in a first hold processor, an identifier to be associated with the call to be held;

sending the identifier to the mobile subscriber unit; and switching the call, at a base station controller, from the mobile subscriber unit to the hold processor, thus holding the call;

wherein the base site controller processes the request to hold the call.

2. A method as described in claim 1, further comprising the step of handing the held call over to a second hold processor if the mobile subscriber unit moves to a second serving area.

3. A method as described in claim 1, further comprising the step of re-establishing the call to the mobile subscriber unit upon receiving a request to re-establish from the mobile subscriber unit.

* * * * *